March 18, 1924.  
A. BREZOVITZ ET AL  
DUMP CAR  
Filed April 24, 1919   6 Sheets-Sheet 1
1,487,201
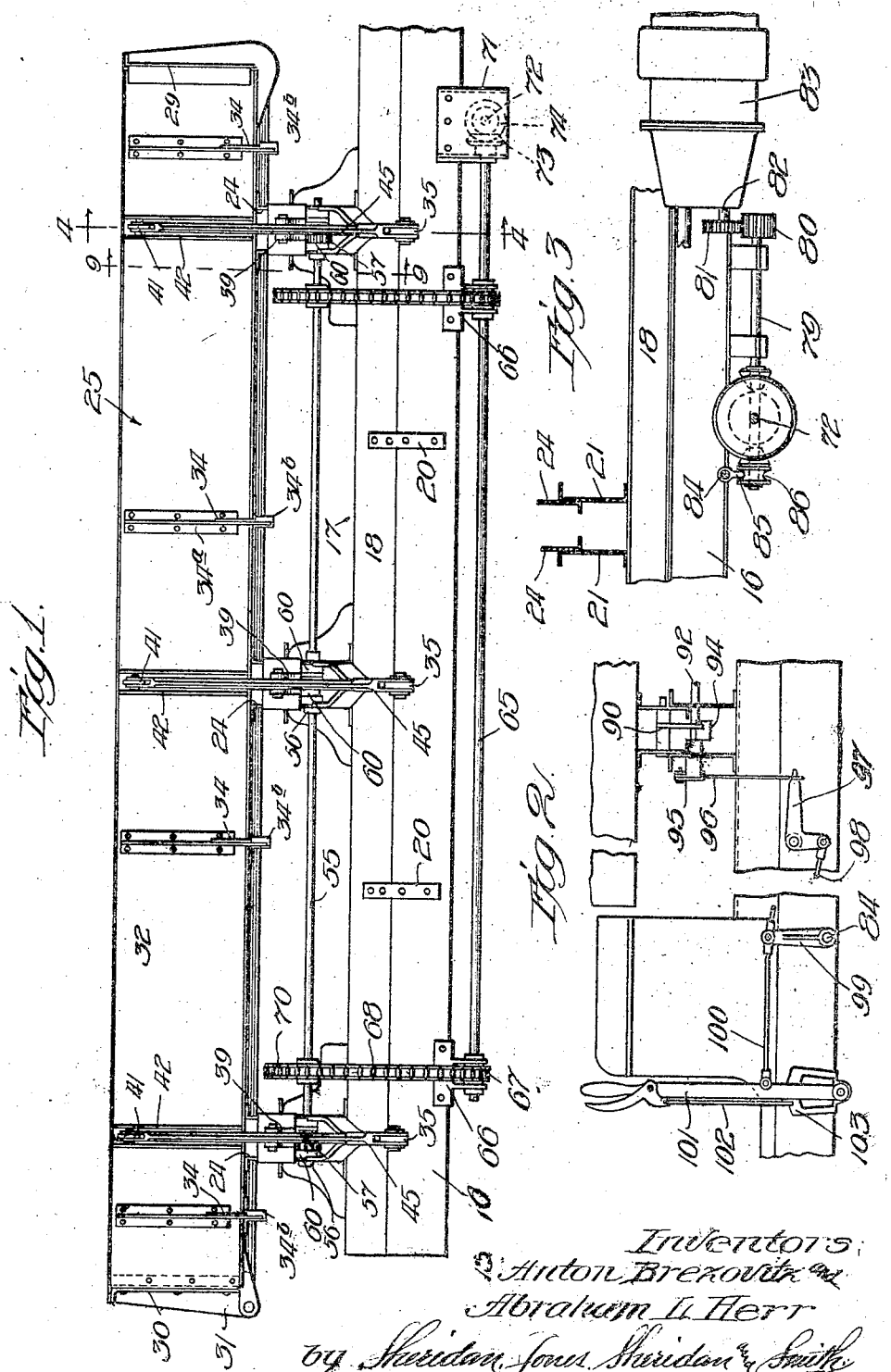

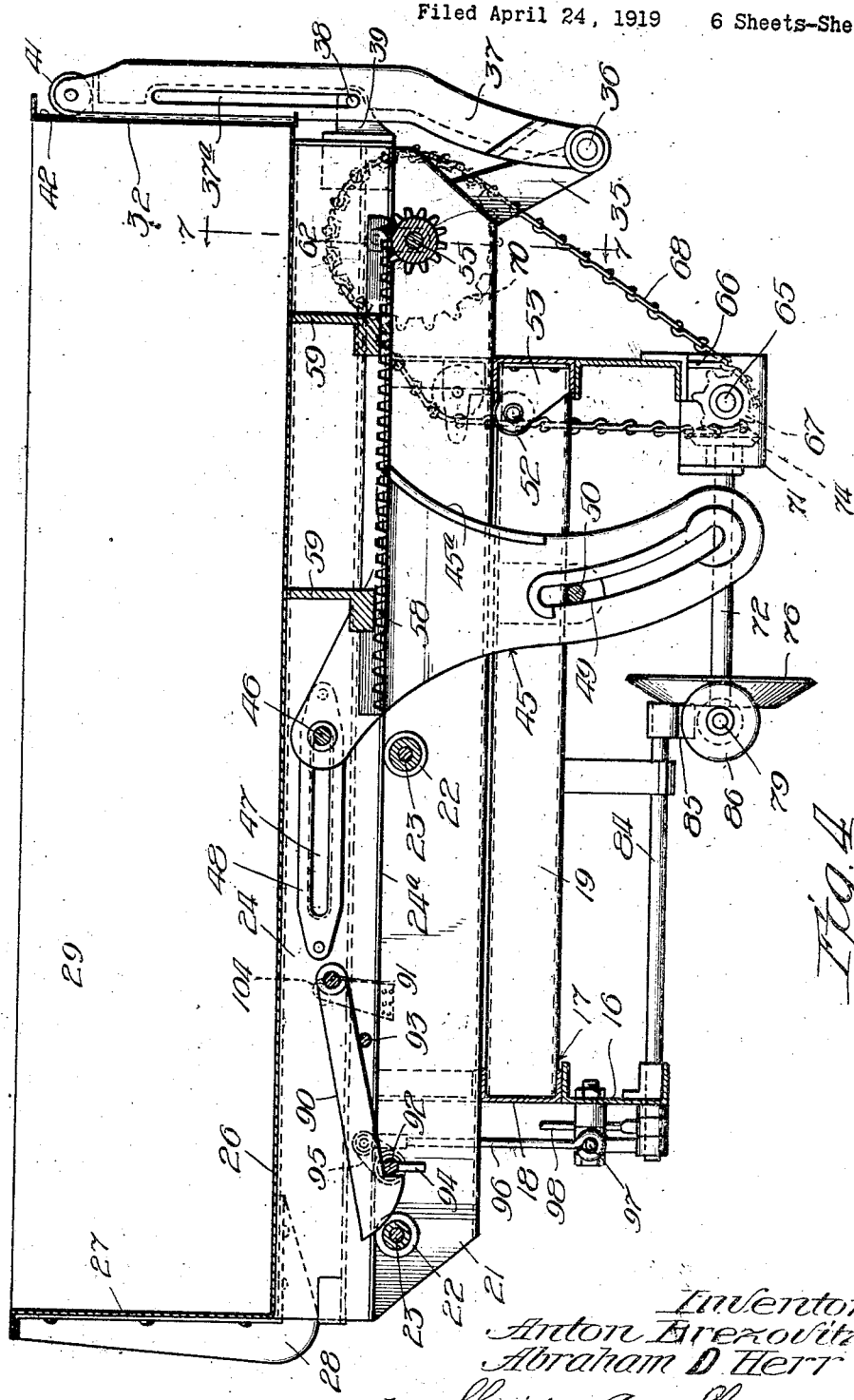

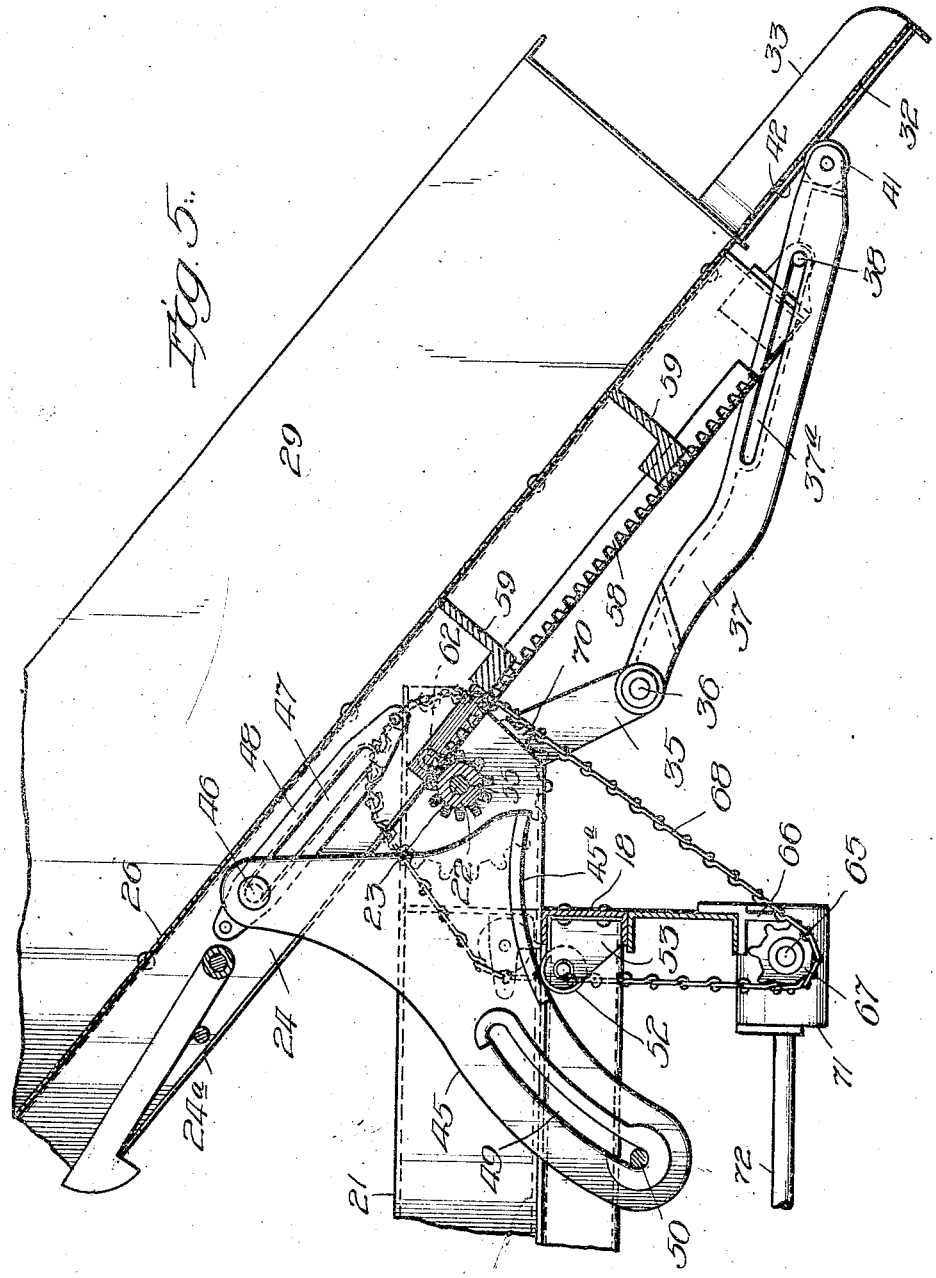

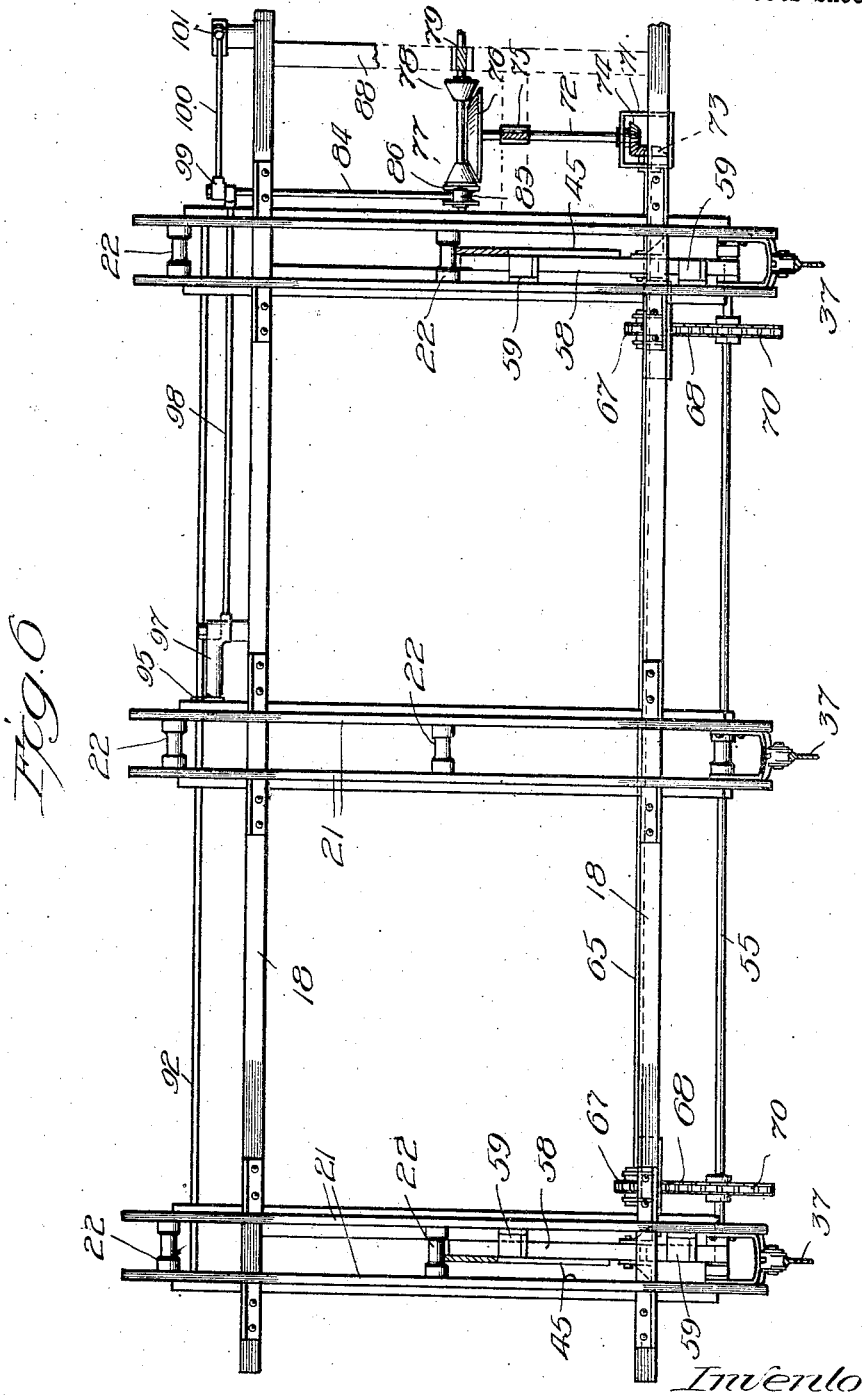

March 18, 1924.
A. BREZOVITZ ET AL
DUMP CAR
Filed April 24, 1919    6 Sheets-Sheet 5
1,487,201
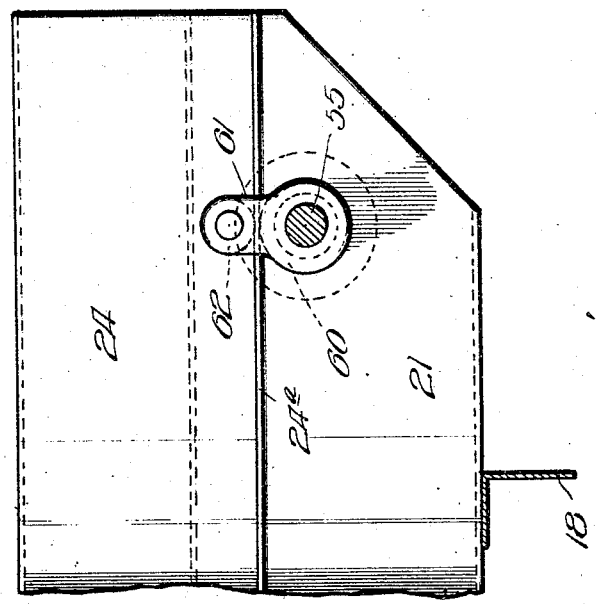
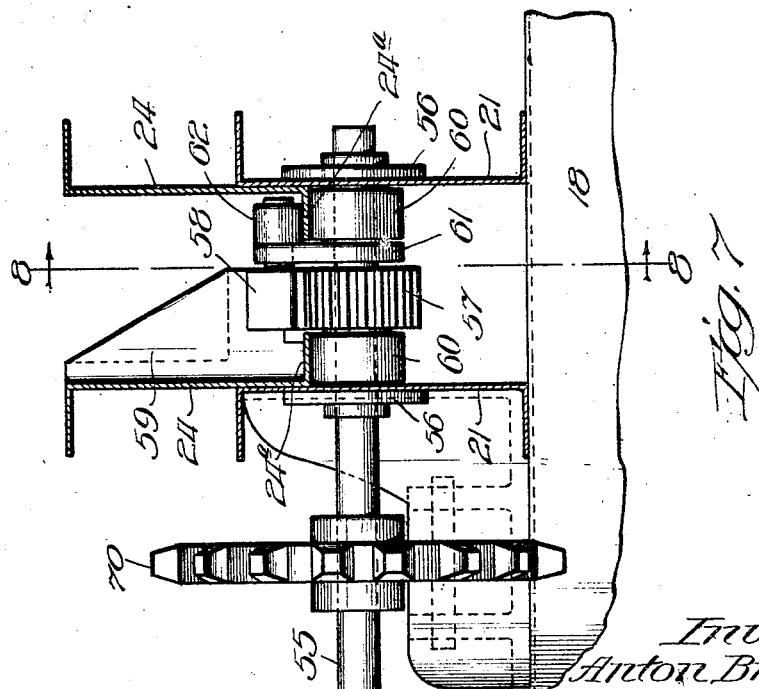

March 18, 1924.
A. BREZOVITZ ET AL
1,487,201
DUMP CAR
Filed April 24, 1919    6 Sheets-Sheet 6
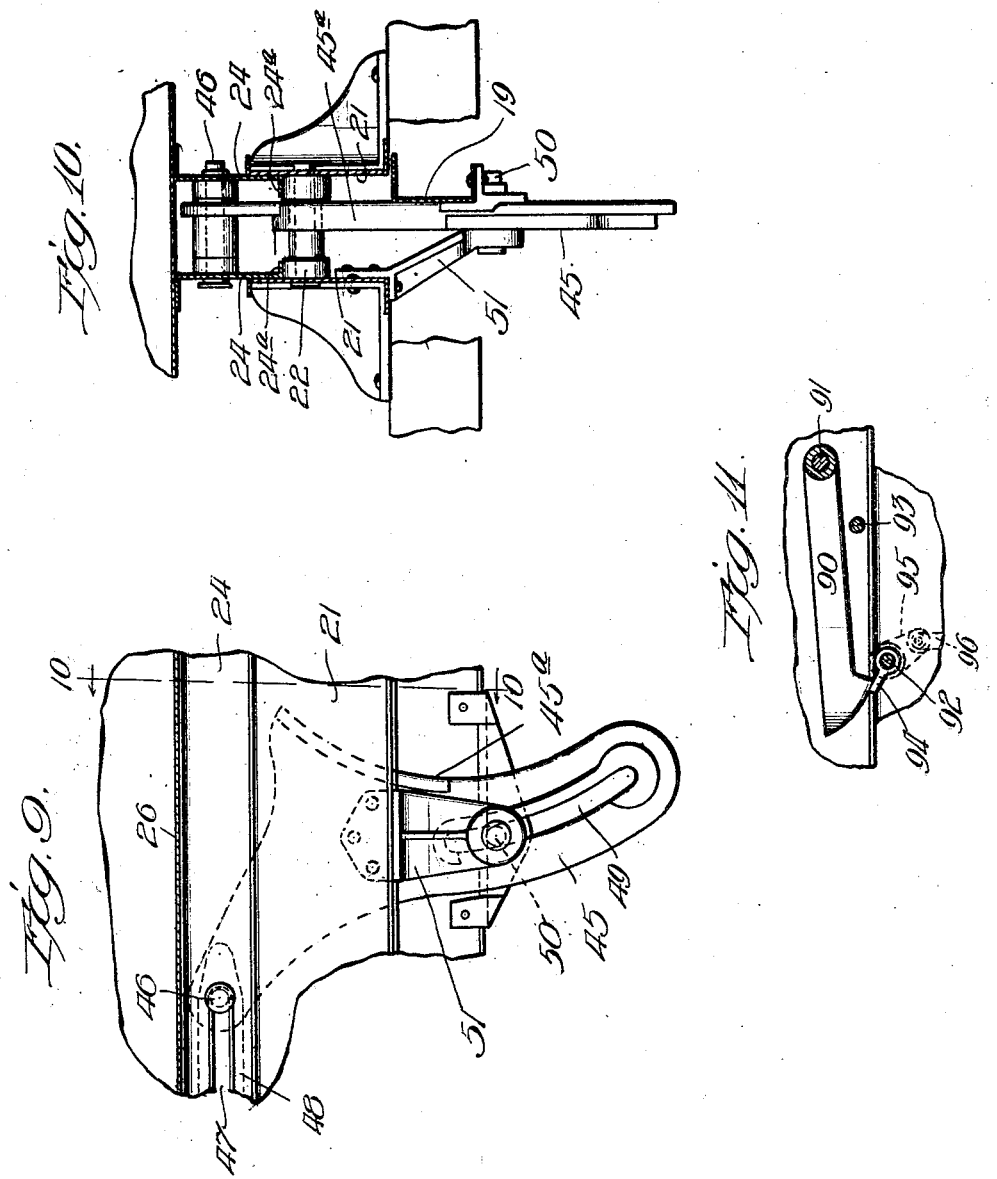

Patented Mar. 18, 1924.

1,487,201

UNITED STATES PATENT OFFICE.

ANTON BREZOVITZ AND ABRAHAM L. HERR, OF SOUTH BEND, INDIANA.

DUMP CAR.

Application filed April 24, 1919. Serial No. 293,340.

*To all whom it may concern:*

Be it known that we, ANTON BREZOVITZ, a citizen of the former Kingdom of Hungary, residing at South Bend, in the county of St. Joseph and State of Indiana, and ABRAHAM L. HERR, a citizen of the United States, residing at South Bend, in the county of St. Joseph and State of Indiana, have invented certain new and useful Improvements in Dump Cars, of which the following is a specification.

This invention relates to dump cars, and its purpose is to provide an improved dumping body for automobile trucks and the like. The principal object of the invention is to provide an improved dumping body adapted to be operated by the power plant of the automobile truck. Another object is to provide a side dumping body having improved operating mechanism adapted to be operated by the power transmitting mechanism of the automobile. Another object is to provide an improved side dumping body in combination with improved gearing mechanism for moving the body in a lateral direction, tilting the same to dumping position, and returning the body to its normal horizontal position above the frame. Still another object is to provide means for locking the body in its normal position on the frame and for releasing said locking means to permit dumping of the car. Other objects relate to various features of construction and arrangement which will appear more fully hereinafter.

The nature of the invention will be understood from the following specification, taken with the accompanying drawings, in which one embodiment is illustrated.

In the drawings—

Figure 1 shows a side elevation of the rear portion of an automobile truck embodying our improved dumping body;

Fig. 2 is a fragmentary side elevation of the side of the car opposite that illustrated in Fig. 1, showing the mechanism for operating the locking device;

Fig. 3 is a longitudinal sectional view through the frame adjacent the forward part of the body, showing the means for connecting the actuating mechanism to the transmission of the automobile truck;

Fig. 4 shows an enlarged transverse sectional view through the truck on the line 4—4 of Fig. 1;

Fig. 5 is a sectional view similar to Fig. 4, showing the body in dumping position;

Fig. 6 shows a plan view of the frame and operating mechanism with the body removed;

Fig. 7 is an enlarged sectional view taken on the line 7—7 of Fig. 4;

Fig. 8 is an enlarged elevation of the end of one of the transverse supporting beams showing the axis about which the body tilts, and illustrating the means for holding the body downwardly with respect to the supporting frame;

Fig. 9 is a partial transverse sectional view on the line 9—9 of Fig. 1, showing the connections of one of the guiding members;

Fig. 10 is a longitudinal sectional view on the line 10—10 of Fig. 9; and

Fig. 11 shows an elevation of one of the locking levers after it has been released.

The automobile truck, designated generally by the numeral 15, comprises a supporting frame having longitudinal side frame members 16 of channel form connected by suitable transverse frame members. A supplementary frame 17 is seated on the side frame members 16, the supplementary frame comprising longitudinal side frame members 18 of channel form and transverse frame member 19. The members 18 are secured to the longitudinal frame members 16 by vertically extending cleats or plates 20, which are riveted thereto. The auxiliary frame 17 is adapted to be mounted on the underframe of substantially any automobile truck. The auxiliary frame 17 has mounted thereon a plurality of transverse supporting members 21 of channel form, which are arranged in pairs with their flanges directed away from each other, the lower flanges being riveted or otherwise secured to the longitudinal frame members 18. The transverse frame members 21 project beyond the lateral edges of the frame 17 and have mounted between them the rollers 22, which are supported by pivot pins 23. These rollers are adapted to coact with the lower flanges 24ª of track or rail members 24 of Z-bar form, which are arranged in pairs with their lower flanges 24ª directed inwardly and with their upper flanges riveted or otherwise secured to the floor 26 of the truck body 25. Each pair of members 24 fits loosely between a pair of members 21, thereby preventing movement of the body longitudinally of the frame. This truck body has one side wall 27, rigidly secured to the floor 26 by means of the braces 28, and a forward end wall 29 which is also rigidly secured to the floor 26 and to the side wall 27. The rear end wall 30 is mounted on hinges 31 to swing downwardly from the rigid side wall 27, but this rear wall is normally held in its upright position by suitable locking means. The body 25 is provided with a movable side wall 32 opposite the fixed side wall 27, the ends of the wall 32 being adapted to seat against the ends of the end walls 29 and 30. The side wall 32 is provided at its ends with flanges 33 adapted to overlap the end walls of the body, and this movable side wall is mounted to swing about its lower edge by means of hinges 34 comprising relatively movable hinged members 34ª and 34ᵇ secured to the side wall and to the underside of the body, respectively, so that when the side wall is swung downwardly and outwardly, as illustrated in Fig. 5, the lower edge of the side wall 32 maintains a close connection with the edge of the bottom 26.

The ends of the transverse frame members 21, at the right hand side of the car, have depending brackets 35 riveted or otherwise secured thereto. These brackets are pivoted by pins 36 to the door operating arms 37 which extend upwardly at the side of the movable wall 32, and are provided with longitudinal slots 37ª adapted to be engaged by pins 38 which are carried by brackets 39 secured to the transverse track members 24. The upper or outer ends of the levers 37 have rollers 41 mounted thereon to coact with the wear plates or tracks 42, which are secured to the outer sides of the 'le wall 32. When the body 25 is moved transversely of the frame to the inclined dumping position shown in Fig. 5, the pins 38 move outwardly to the outer ends of the slots 37ª, while the rollers 41 move downwardly on the plates 42, thus allowing the side door or wall 32 to swing about its hinges to the inclined dumping position in alinement with the floor 26, as shown in Fig. 5, in which position the door is supported by the levers 37. The opening movement of the door is limited by the pins 38 engaging the ends of the slots 37ª. When the body is returned to its normal position above the supporting frame, the levers 37, sliding on the pins 38, automatically return the side door 32 to its closed position and hold it in that position, as shown in Fig. 4.

The tilting movement of the body 25 is controlled by a plurality of guiding members 45, one of which is mounted between each pair of transverse frame members 21. Each guiding member 45 is provided at its upper end with a transverse pin 46 adapted to engage one of the slots 47 in the track members 24, which are secured to the under side of the body. These track members are reinforced around the slots 47 by the slotted members 48, which are secured to the members 24. The lower part of each guiding member 45 is curved downwardly and outwardly toward the side of the body and is provided with a curved slot 49 adapted to be engaged by a pin 50 supported between the transverse frame member 19 and the bracket 51 secured to a transverse frame member 21. Each controlling member 45 is further provided on its outer side with a curved surface 45ª which is adapted to coact with the rollers 52 carried by the brackets 53 secured to the longitudinal frame members 18. In the operation of dumping the body, it is first moved toward the right, as viewed in Fig. 4, until the pins 46 occupy positions at the left-hand ends of the slots 47, whereupon the continued operation of the actuating mechanism causes the body to tilt upwardly. The pins 50 then travel in the slots 49 and the controlling members 45 travel on the rollers 52 as the body tilts over the edge of the supporting frame. The tilting of the body is limited by the engagement of the pins 50 with the lower ends of the slots 49.

The movement of the body 25 toward the right, and the tilting movement thereof are effected by means of a shaft 55 which extends longitudinally of the auxiliary frame 17 and is journaled in bearings 56 carried by the ends of the transverse frame members 21, as shown, for example, in Figs. 4 and 5. The shaft is provided between the pairs of supporting members 21 at the forward and rear ends of the body with driving pinions 57, which are secured to the shaft and adapted to engage rack bars 58 secured to the brackets 59 carried by and between the track members 24 on the underside of the body. A roller 22 is mounted on the shaft 55 between the middle pair of supporting members 21.

The rollers 60 are rotatably mounted on the shaft 55 on opposite sides of each pinion 57, and these rollers coact with the lower flanges of the track members 24, similar to the operation of the rollers 22 previously described. The shaft 55 also has rotatably mounted thereon, between one of the rollers 60 and each pinion 57, a holding member 61 which carries on the upper part thereof a pivoted roller 62 adapted to coact with the upper side of the flange 24ª of the adjacent track member. As the shaft 55 rotates the pinions 57 engaging the rack-bars 58 cause the truck body to move to the right as viewed in Fig. 4, and after the limit of the horizontal movement has been reached the body begins to tilt and finally assumes a pivotal movement about the axis of the shaft 55. During this pivotal movement the body is held against upward movement with respect to the supporting frame by means of the holding devices 61. Upon rotation of the shaft 55 in the reverse direction the pinions 57 co-operate with the rack-bars 58 to return the body to its normal horizontal position.

The shaft 55 is driven by a parallel shaft 65 which is journaled in bracket 66 secured to the longitudinal side frame member 16 of the truck. This shaft 65 has sprocket wheels 67 carried thereon between the arms of the bracket 66, and the sprocket chains 68 connect the sprocket wheel 67 with other sprocket wheels 70 which are secured to the shaft 55. Adjacent the forward end of the body of the shaft 65 is extended into a housing 71 and is there connected with a transverse driving shaft 72 through beveled gears 73 and 74. The shaft 72 is journaled in a bearing 75 and the other end thereof carries a fixed beveled friction disk 76 adapted to coact with either of two beveled friction disks 77 and 78, which are secured on the longitudinally extending shaft 79. The shaft 79 extends forwardly from the shaft 72 and a gear 80 keyed thereon meshes with a gear 81 secured on the lower shaft 82 of the transmission mechanism 83, so that the shaft 79 is constantly driven when the transmission shaft 82 is in operation. The beveled disks 77 and 78 are spaced apart so that when the shaft 79 is in its neutral position neither of these disks will coact with the friction disk 78, but upon movement of the shaft 79 longitudinally one of the disks 77 or 78 will be brought into engagement with the disk 76, thereby operating the shafts 72, 65 and 55 to move the body of the truck in the desired direction. The reciprocation of the longitudinal shaft 79 is effected by means of a shaft 84 which carries a dog 85 adapted to engage a grooved collar 86 mounted on the shaft 79. The shaft 84 extends transversely of the frame and is rotated simultaneously with the operation of mechanism for locking the body in position on the frame. The shafts 79 and 84 are journaled in bearings carried by supporting members 88 secured to the main truck frame.

The locking mechanism above referred to comprises a series of locking levers or hooks 90, which are pivoted on pins 91 secured to and extending between the pairs of track members 24. The members 90 are provided with hooked extremities adapted to engage the longitudinal shaft 92, which extends throughout the length of the car, being mounted in bearings formed in the projecting ends of the frame members 21 at the ends thereof opposite the shaft 55. The downward movement of each hook 90 is limited by a pin 93 extending between the members 24 and when the operator desires to release the body to permit the dumping movement thereof the shaft 92 is rotated, thereby causing the dogs 94 secured thereon to engage the ends of the hooks 90 and elevate them out of engagement with the shaft 92. The hooks then pass over the shaft 92 as the body moves toward the right. The rotation of the shaft 92 is effected by a crank arm 95 secured to the forward end thereof and attached to a downwardly extending link 96. The link 96 engages one arm of a bell crank lever 97 and the other arm of this lever is pivoted to a connecting rod 98 which extends forwardly at the side of the frame and is attached at its forward end to the upper extremity of a crank arm 99 which is secured to the transverse rod or shaft 84 previously described. From the upper extremity of the crank arm 99 an operating rod 100 extends in a forward direction and is connected to an operating lever 101 pivoted on the side frame member 16 and adapted to be held in the desired position by means of a latch 102 engaging a notched bracket 103. When the lever 101 is moved in a forward direction the dogs 94 are elevated, thereby raising the hooks 90 out of engagement with the shaft 92 and releasing the body. At the same time the angular movement of the shaft 84 causes the friction disk 77 to engage the disk 76 and thereby drive the shafts 72 and 65 in the proper direction to move the body toward dumping position. When the lever 101 is moved in a rearward direction the dogs 94 are lowered to the position shown in Fig. 4, and at the same time the shaft 84 is operated to move the other friction disk 78 into engagement with the disk 76. The shafts 65 and 55 are thereupon operated to return the body to its normal horizontal position above the frame and, as it reaches the limit of this movement, the inclined end faces of the hooks 90 ride up over the shaft 92 until the hooks engage that shaft. The pins 93 previously referred to hold the hooks 90 in proper position to engage the shaft 92 when the body returns to its normal position. The limit of the return movement of the body is determined by hooks 104 which are secured to the upper sides of the frame members 21 and engage the transverse pins 91 upon which the hooks 90 are mounted.

From the foregoing description it will be understood that the body is positively moved to and from its dumping position by means of the power connections which extend to the transmission shaft of the truck. The movement of the body can be controlled by the operation of the lever 101 located adjacent to the seat of the truck, so that it is possible for the driver to dump the contents of the car and return the body to its normal position without leaving his seat. The locking and unlocking of the body is effected simultaneously with the actuation of the power mechanism, so that the entire operation of the body is controlled by a single lever. It will be understood that the initial movement of the body toward its dumping position imparts considerable momentum thereto and this force, acting with the weight of the overhanging portion of the body, serves to co-operate with the action of the racks and pinions to effect the tilting of the body after the limit of the horizontal movement thereof has been reached. As soon as the body begins to move horizontally towards its dumping position the door-operating levers 37 are carried outwardly about the pins 38, due to the fact that the lower ends of these levers are held by the supporting frame. As the levers 37 swing outwardly the pins 38 travel outwardly in the slots 37ᵃ and the rollers 41 travel inwardly on the track members 42, so that the side door of the car is automatically supported as it moves to the inclined position shown in Fig. 5. In this position the side door is held by the levers 37 in alinement with the floor of the body. When the body is returned to its normal position by the reverse operation of the driving pinions, the levers 37 are automatically elevated by the pins 38 and the side door 32 is thereby positively returned to its closed position.

Although we have shown and described a certain embodiment of the invention for purposes of illustration, it will be understood that it may be constructed in various other forms without departing from the scope of the appended claims.

We claim:

1. The combination in a dump car of a supporting frame, a body adapted to move laterally and tilt on said frame, a transmission shaft carried by said frame, means operated by said transmission shaft for moving and tilting said body, means for locking said body in position on said frame, and means operated simultaneously with the starting operation of said moving means for releasing said locking means.

2. The combination in a dump car of a supporting frame, a body adapted to move laterally on said frame and to tilt over the edge thereof, a shaft mounted longitudinally of said frame adjacent the edge thereof about which said body tilts, rack-bars secured to the under side of said body and extending transversely thereof, pinions fixed on said shaft and engaging said rack-bars, a second shaft extending longitudinally of said frame parallel to said first-named shaft, sprocket wheels and chains connecting said shafts, a third shaft extending transversely of said frame and geared to said second shaft, a power transmission shaft carried by said frame, and means for causing said power transmission shaft to drive said third shaft in either direction.

3. The combination in a dump car of a supporting frame, a body adapted to move laterally on said frame and to tilt over the edge thereof, a shaft mounted longitudinally of said frame adjacent the edge thereof about which said body tilts, rack-bars secured to the under side of said body and extending transversely thereof, pinions fixed on said shaft and engaging said rack-bars, a second shaft extending longitudinally of said frame parallel to said first-named shaft, sprocket wheels and chains connecting said shafts, a third shaft extending transversely of said frame and geared to said second shaft, a power transmission shaft carried by said frame, a friction disc secured on said third shaft, a driving shaft having two friction disks thereon adapted to engage said first-named friction disk, means for operating said driving shaft, and means for moving either of said last-named friction disks into moving engagement with said first-named friction disk.

4. The combination in a dump car of a supporting frame, a body adapted to move laterally on said frame and to tilt over the edge thereof, a shaft mounted longitudinally of said frame adjacent the edge thereof about which said body tilts, rack-bars secured to the under side of said body and extending transversely thereof, pinions fixed on said shaft and engaging said rack-bars, a second shaft extending longitudinally of said frame parallel to said first-named shaft, sprocket wheels and chains connecting said shafts, a third shaft extending transversely of said frame and geared to said second shaft, a power transmission shaft carried by said frame, friction disks secured on said third shaft, a driving shaft having two friction disks thereon adapted to engage said first-named friction disk, means for operating said driving shaft, means for moving either of said last-named friction disks into moving engagement with said first-named friction disk, means for locking said body in position on said frame, and means operated by said disc-moving means for releasing said locking means.

5. The combination in a dump car of a frame, transversely extending supporting members arranged in pairs and mounted on said frame, rollers carried between said supporting members, a body, track members secured to the under side of said body and engaging said rollers between said supporting members, rack-bars carried by said body adjacent said track members, a longitudinally extending shaft mounted in bearings carried by said supporting members, pinions mounted on said shaft and engaging said rack-bars, and power actuated means connected to said shaft for operating it.

6. The combination in a dump car of longitudinal frame members, transverse supporting members carried by said frame members, a body, transverse track members secured to the under side of said body, said track members being arranged in pairs and extending downwardly adjacent each of said supporting members, rollers carried by said supporting members to coact with said track members, rack-bars mounted between said track members, a shaft extending longitudinally of said frame and mounted in bearings carried by said supporting members, pinions mounted on said shaft to engage said rack-bars, a second longitudinal shaft carried by one of said longitudinal frame members, sprocket wheels fixed on each of said shafts and sprocket chains extending around said longitudinal frame member and connecting said sprocket wheels.

7. The combination in a dump car of a supporting frame, transverse supporting members carried by said frame, rollers mounted on said transverse supporting members, a body, transverse track members carried by said body and adapted to travel on said rollers, said body having a side door hinged along the lower edge thereof, rack-bars secured to said body, a shaft extending longitudinally of said supporting frame, pinions secured to said shaft and meshing with said rack-bars, power operated means for driving said shaft to move said body to and from dumping position, and means actuated by the movement of said body for automatically opening and closing said side door.

8. The combination in a dump car of a supporting frame, transverse supporting members carried by said frame, rollers mounted on said transverse supporting members, a body, transverse track members carried by said body and adapted to travel on said rollers, said body having a side door hinged along the lower edge thereof, rack-bars secured to said body, a shaft extending longitudinally of said supporting frame, pinions secured to said shaft and meshing with said rack-bars, power operated means for driving said shaft to move said body to and from dumping position, means actuated by the movement of said body for automatically opening and closing said side door, and means connecting said supporting members and said track members for limiting the dumping movement of said body.

9. The combination in a dump car of a supporting frame, transverse supporting members carried by said frame, rollers mounted on said transverse supporting members, a body, transverse track members carried by said body and adapted to travel on said rollers, said body having a side door hinged along the lower edge thereof, rack-bars secured to said body, a shaft extending longitudinally of said supporting frame, pinions secured to said shaft and meshing with said rack-bars, means for driving said shaft to move said body to and from dumping position, means actuated by the movement of said body for automatically opening and closing said side door, said means including a lever pivoted on said frame and loosely engaging the outer side of said door for automatically opening and closing the same upon movement of said body.

10. The combination in a dump car of a supporting frame, transverse supporting members carried by said frame, rollers mounted on said transverse supporting members, a body, transverse track members carried by said body and adapted to travel on said rollers, said body having a side door hinged along the lower edge thereof, rack-bars secured to said body, a shaft extending longitudinally of said supporting frame, pinions secured to said shaft and meshing with said rack-bars, means for driving said shaft to move said body to and from dumping position, means actuated by the movement of said body for automatically opening and closing said side door, a lever pivoted on said frame and extending upwardly at the outer side of said door, said lever having a longitudinal slot therein, a pin carried by said body beneath said door and engaging said slot, and means carried by said lever to coact with the outer side of said door as said body moves to and from dumping position.

11. The combination in a dump car of longitudinal frame members, transverse supporting members arranged in pairs on said frame members, a body adapted to travel transversely on said supporting members, guiding members mounted between said pairs of supporting members, means for forming sliding connections between said guiding members and both said supporting members and said body, a longitudinal shaft journaled in said supporting members adjacent one edge of said body, transverse rack-bars carried by the under side of said body, pinions fixed on said shaft and engaging said rack-bars, and power operated means for rotating said shaft in either direction to move said body to and from said dumping position.

12. The combination in a dump car of longitudinal frame members, transverse supporting members arranged in pairs on said frame members, a body adapted to travel transversely on said supporting members, guiding members mounted between said pairs of supporting members, means for forming sliding connections between said guiding members and both said supporting members and said body, a longitudinal shaft journaled in said supporting members adjacent one edge of said body, transverse rack-bars carried by the under side of said body, pinions fixed on said shaft and engaging said rack-bars, power operated means for rotating said shaft in either direction to move said body to and from said dumping position, and rollers carried by said frame members and adapted to coact with said guiding members during the dumping movement of said body.

13. The combination in a dump car of a frame, transverse supporting members mounted on said frame, a body, transverse track members secured to the under side of said body and extending downwardly adjacent said supporting members, locking members carried by said track members, a longitudinal shaft carried by said supporting members and adapted to be engaged by said locking members, means for moving said body transversely of said frame to dump the same, and means operated simultaneously with the initial operation of said last-named means for rotating said shaft to release said locking members.

14. The combination in a dump car of a frame, transverse supporting members mounted on said frame, a body, transverse track members secured to the under side of said body and extending downwardly adjacent said supporting members, locking members carried by said track members, a longitudinal shaft carried by said supporting members and adapted to be engaged by said locking members, lugs carried by said shaft and adapted upon rotation thereof to disengage said locking members, driving means for moving said body transversely of said frame, means for controlling said driving means, and means operated by said controlling means for rotating said shaft to disengage said locking members therefrom.

15. The combination in a dump car of a frame, transverse supporting members mounted on said frame, a body, transverse track members secured to the under side of said body and extending downwardly adjacent said supporting members, locking members carried by said track members, a longitudinal shaft carried by said supporting members and adapted to be engaged by said locking members, lugs carried by said shaft and adapted upon rotation thereof to disengage said locking members, driving means for moving said body transversely of said frame, means for controlling said driving means, means operated by said controlling means for rotating said shaft to disengage said locking members therefrom, and means independent of said locking members for limiting the movement of said body from dumping position.

In testimony whereof, we have subscribed our names.

ANTON BREZOVITZ.
ABRAHAM L. HERR.